United States Patent [19]

Kiyohide et al.

[11] Patent Number: 5,665,322

[45] Date of Patent: Sep. 9, 1997

[54] METHOD OF CLEANING EXHAUST GAS

[75] Inventors: Yoshida Kiyohide; Sumiya Satoshi; Muramatsu Gyo, all of Kumagaya; Sato Shinri, Sapporo, all of Japan

[73] Assignee: Kabushiki Kaisha Riken, Saitama-Ken, Japan

[21] Appl. No.: 579,804

[22] Filed: Dec. 28, 1995

Related U.S. Application Data

[63] Continuation of Ser. No. 255,125, Jun. 7, 1994, abandoned, which is a continuation of Ser. No. 757,966, Sep. 12, 1991, abandoned, which is a division of Ser. No. 493,974, Mar. 15, 1990, Pat. No. 5,075,274.

[30] Foreign Application Priority Data

| Mar. 15, 1989 | [JP] | Japan | 1-63019 |
| Mar. 15, 1989 | [JP] | Japan | 1-63020 |
| Oct. 3, 1989 | [JP] | Japan | 1-258568 |
| Oct. 3, 1989 | [JP] | Japan | 1-258569 |
| Oct. 3, 1989 | [JP] | Japan | 1-258570 |
| Nov. 10, 1989 | [JP] | Japan | 1-293121 |
| Nov. 10, 1989 | [JP] | Japan | 1-293122 |

[51] Int. Cl.⁶ ................................................ B01D 53/50

[52] U.S. Cl. ........................ 423/213.5; 423/213.7; 423/215.5

[58] Field of Search ............... 423/212, 213.2, 423/213.5, 213.7, 215.5; 502/439, 330, 302, 303, 304, 313, 324, 326, 328, 329, 331; 264/42, 44, 43; 55/523

[56] References Cited

U.S. PATENT DOCUMENTS

| 3,468,989 | 9/1969 | McMillan | 264/43 |
| 4,303,552 | 12/1981 | Ernest et al. | 423/213.5 |
| 4,451,441 | 5/1984 | Ernest et al. | 502/527 |
| 4,515,758 | 5/1985 | Domesle et al. | 423/215.5 |
| 4,711,870 | 12/1987 | Yamada et al. | 423/215.5 |
| 4,828,807 | 5/1989 | Domesle et al. | 423/215.5 |
| 4,912,076 | 3/1990 | Mizrah et al. | 502/439 |
| 4,976,760 | 12/1990 | Helferich et al. | 55/523 |
| 5,000,929 | 3/1991 | Horiuchi et al. | 423/215.5 |
| 5,100,632 | 3/1992 | Dettling et al. | 423/213.5 |
| 5,108,977 | 4/1992 | Yoshida et al. | 502/303 |

FOREIGN PATENT DOCUMENTS

| 4008371 | 9/1990 | Germany. | |
| 53-108891 | 9/1978 | Japan | 423/247 |
| 62-20613 | 1/1987 | Japan | 423/213.5 |
| 63-242346 | 10/1988 | Japan. | |
| 89-03720 | 5/1989 | WIPO | 423/215.5 |

*Primary Examiner*—Steven Bos
*Assistant Examiner*—Peter DiMauro
*Attorney, Agent, or Firm*—Brumbaugh, Graves, Donohue & Raymond

[57] ABSTRACT

An exhaust gas cleaner having a heat-resistant, porous foam-type filter as a carrier, the filter being constituted by two portions consisting of a portion having a relatively low density and a high-density, thin layer portion formed on one side of the low density portion, the low-density portion supporting a base metal catalyst consisting essentially of (a) at least one of alkali metal elements, and (b) one or more elements selected from the group consisting of transition elements (excluding platinum-group elements) and Sn, and the high-density, thin layer portion supporting a platinum-group element catalyst. The base metal catalyst may further contain at least one of rare earth elements. The exhaust gas cleaning method is conducted by using this cleaner with its low-density portion on the exhaust gas inlet or outlet side.

8 Claims, No Drawings

METHOD OF CLEANING EXHAUST GAS

This application is a continuation of application Ser. No. 08/255,125, filed on Jun. 7, 1994, now abandoned, which is a continuation of application Ser. No. 07/757,966, filed on Sep. 12, 1991, now abandoned, which is a division of application Ser. No.07/493,974, filed on Mar. 15, 1990, now U.S. Pat. No. 5,075,274.

BACKGROUND OF THE INVENTION

The present invention relates to an exhaust gas cleaner and a method of cleaning an exhaust gas by using such an exhaust gas cleaner, and more particularly to an exhaust gas cleaner constituted by a foam-type filter carrying a catalyst and a method of cleaning an exhaust gas by this exhaust gas cleaner.

Recently, nitrogen oxides simply called $NO_x$ and fine carbonaceous particles (hereinafter referred to as "particulate matter") contained in exhaust gases of diesel engines, etc. are causing environmental problems. In particular, the particulate matter is likely to float in the air and be inhaled by breathing. Accordingly, the reduction of the particulate matter has been strongly desired, and various proposals have been made for trapping and burning the particulate matter by heat-resistant filters, and for regenerating filters by burning the particulate matter at a low temperature by using heat-resistant filters provided with catalysts, etc. Particularly in the latter case, the filters can be regenerated at a low temperature in a short period of time, meaning that it is an excellent method when the heat resistance of the filters is taken into consideration.

The exhaust gases of the diesel engines have much lower temperature and larger oxygen concentration than those of gasoline engines. The oxygen concentration is variable in the range of 2–20%. In addition, since a diesel oil is used as a fuel in diesel engines, the exhaust gases contain a large amount of $SO_2$. Nevertheless, there has been no established method of well igniting and burning fine carbon particles accumulated under these exhaust gas conditions without causing secondary pollution.

For instance, when precious metal catalysts are supported on filters, the ignition temperature of particulate matter can be lowered, and the removal of the remaining (unburned) hydrocarbons and CO can be achieved, but there are problems such as the deterioration of catalyst activities by ashes. On the other hand, when base metal catalysts are used, the ignition temperature of particulate matter can be effectively lowered without forming much $SO_3$. However, such catalysts are not effective for removing CO.

Besides, the catalysts currently used in the industry mainly function to lower the ignition temperature of particulate matter, leaving unsolved the problems of removing nitrogen oxides from exhaust gases of diesel engines containing a large concentration of oxygen. Accordingly, investigation has been conducted to remove nitrogen oxides and particulate matter simultaneously, but conventional catalysts fail to sufficiently remove the other harmful components such as CO and remaining (unburned) hydrocarbons together with nitrogen oxides and particulate matter.

Next, with respect to filter structure per se, there are two types of filters, a ceramic honeycomb filter and a ceramic foam filter. The honeycomb filter is efficient in trapping particulate matter, but it suffers not only from the decrease in catalytic activity by the accumulation of ashes generated by burning lubricating oils, but also from cracking and fusion by spot heating at the time of igniting particulate matter. In addition, since catalyst is mainly supported on inner walls of filter pores, the area of the catalyst-carrying surface is relatively small, resulting in insufficient catalytic activity.

On the other hand, the ceramic foam filter has a large surface area for carrying catalysts, but it is insufficient in trapping particulate matter. Therefore, it has been desired to provide the ceramic foam filter with catalysts having high exhaust gas-cleaning efficiency.

OBJECT AND SUMMARY OF THE INVENTION

An object of the present invention is to provide an exhaust gas cleaner capable of not only effectively burning particulate matter contained in the exhaust gas having a relatively large oxygen concentration such as those of diesel engines but also effectively removing the remaining (unburned) hydrocarbons and CO by reaction with the remaining oxygen while suppressing the formation of $SO_3$.

Another object of the present invention is to provide an exhaust gas cleaner capable of removing particulate matter and nitrogen oxides simultaneously and also capable of removing the other harmful components: remaining (unburned) hydrocarbons and CO.

A further object of the present invention is to provide a method of cleaning an exhaust gas by using the above exhaust gas cleaners.

As a result of intense research in view of the above objects, the inventors have found that particulate matter, unburned hydrocarbons and CO can be efficiently removed by using a heat-resistant, porous foam-type filter constituted by two layers having different densities provided with a base metal catalyst capable of burning particulate matter and a platinum-group element catalyst capable of increasing the burning efficiency of particulate matter and removing unburned hydrocarbons and CO. Further, the inventors have found that by using base metal catalysts having particular compositions, particulate matter, unburned hydrocarbons and nitrogen oxides can be removed simultaneously, and that the remaining hydrocarbons and CO can be removed by platinum-group element catalysts. The present invention is based on these findings.

Thus, the first exhaust gas cleaner according to the present invention has a heat-resistant, porous foam-type filter as a carrier, the filter being constituted by two portions consisting of a portion having a relatively low density and a high-density, thin layer portion formed on one side of the low density portion, the low-density portion supporting a catalyst consisting essentially of (a) at least one of alkali metal elements, and (b) one or more elements selected from the group consisting of transition elements (excluding platinum-group elements) and Sn, and the high-density, thin layer portion supporting a platinum-group element catalyst.

The second exhaust gas cleaner according to the present invention has a heat-resistant, porous foam-type filter as a carrier, the filter being constituted by two portions consisting of a portion having a relatively low density and a high-density, thin layer portion formed on one side of the low density portion, the low-density portion supporting a catalyst consisting essentially of (a) at least one of alkali metal elements, (b) one or more elements selected from the group consisting of elements in IIA group of the Periodic Table, transition elements (excluding platinum-group elements) and Sn, and (c) at least one of rare earth elements; and the high-density, thin layer portion supporting a platinum-group element catalyst.

The third exhaust gas cleaner according to the present invention has a heat-resistant, porous foam-type filter as a carrier, the filter being constituted by two portions consisting of a portion having a relatively low density and a high-density, thin layer portion formed on one side of the low-density portion, wherein the low-density portion is located on the exhaust gas inlet side of the filter, the high-density, thin layer portion is located on the exhaust gas outlet side of the filter, a catalyst consisting essentially of Cs, Cu and at least one of Ce and La being supported by the overall body of the filter.

The first method of cleaning an exhaust gas according to the present invention uses an exhaust gas cleaner having a heat-resistant, porous foam-type filter as a carrier, the filter being constituted by two portions consisting of a portion having a relatively low density and a high-density, thin layer portion formed on one side of the low density portion, the low-density portion supporting a catalyst consisting essentially of (a) at least one of alkali metal elements, and (b) one or more elements selected from the group consisting of transition elements (excluding platinum-group elements) and Sn, and the high-density, thin layer portion supporting a platinum-group element catalyst, wherein the low-density portion is located on the exhaust gas inlet side of the filter, and the high-density, thin layer portion is located on the exhaust gas outlet side of the filter, so that particulate matter in the exhaust gas is burned or ignited at a low temperature in the low-density portion, and unburned hydrocarbons and CO in the exhaust gas are caused to react with remaining oxygen in the high-density, thin layer portion, thereby cleaning the exhaust gas.

The second method of cleaning an exhaust gas according to the present invention uses an exhaust gas cleaner having a heat-resistant, porous foam-type filter as a carrier, the filter being constituted by two portions consisting of a portion having a relatively low density and a high-density, thin layer portion formed on one side of the low density portion, the low-density portion supporting a catalyst consisting essentially of (a) at least one of alkali metal elements, and (b) one or more elements selected from the group consisting of transition elements (excluding platinum-group elements) and Sn, and the high-density, thin layer portion supporting a platinum-group element catalyst, wherein the high-density, thin layer portion is located on the exhaust gas inlet side of the filter, and the low-density portion is located on the exhaust gas outlet side of the filter, so that particulate matter in the exhaust gas is burned or ignited at a low temperature and unburned hydrocarbons and CO in the exhaust gas are oxidized in the high-density, thin layer portion, and that particulate matter passing through the high-density, thin layer portion is burned in the low-density portion, thereby cleaning the exhaust gas.

The third method of cleaning an exhaust gas according to the present invention uses an exhaust gas cleaner having a heat-resistant, porous foam-type filter as a carrier, the filter being constituted by two portions consisting of a portion having a relatively low density and a high-density, thin layer portion formed on one side of the low-density portion, the low-density portion supporting a catalyst consisting essentially of (a) at least one of alkali metal elements, (b) one or more elements selected from the group consisting of elements in IIA group of the Periodic Table, transition elements (excluding platinum-group elements) and Sn, and (c) at least one of rare earth elements; and the high-density, thin layer portion supporting a platinum-group element catalyst, wherein the low-density portion is located on the exhaust gas inlet side of the filter, and the high-density, thin layer portion is located on the exhaust gas outlet side of the filter, so that particulate matter, unburned hydrocarbons and CO in the exhaust gas are removed by oxidation in the high-density, thin layer portion, and $NO_x$ is reduced by the remaining hydrocarbons and particulate matter in the low-density portion, thereby cleaning the exhaust gas.

The fourth method of cleaning an exhaust gas according to the present invention uses an exhaust gas cleaner having a heat-resistant, porous foam-type filter as a carrier, the filter being constituted by two portions consisting of a portion having a relatively low density and a high-density, thin layer portion formed on one side of the low-density portion, the low-density portion supporting a catalyst consisting essentially of (a) at least one of alkali metal elements, (b) one or more elements selected from the group consisting of elements in IIA group of the Periodic Table, transition elements (excluding platinum-group elements) and Sn, and (c) at least one of rare earth elements; and the high-density, thin layer portion supporting a platinum-group element catalyst; and the high-density, thin layer portion supporting a platinum-group element catalyst, wherein the high-density, thin layer portion is located on the exhaust gas inlet side of the filter, and the low-density portion is located on the exhaust gas outlet side of the filter, so that particulate matter, unburned hydrocarbons and CO in the exhaust gas are removed by oxidation in the high-density, thin layer portion, and $NO_x$ is reduced by the remaining particulate matter and hydrocarbons in the low-density portion, thereby cleaning the exhaust gas.

The fifth method of cleaning an exhaust gas according to the present invention uses an exhaust gas cleaner having a heat-resistant, porous foam-type filter as a carrier, the filter being constituted by two portions consisting of a portion having a relatively low density and a high-density, thin layer portion formed on one side of the low-density portion, the filter supporting a catalyst consisting essentially of Cs, Cu and at least one of Ce and La, wherein the low-density portion is located on the exhaust gas inlet side of the filter, and the high-density, thin layer portion is located on the exhaust gas outlet side of the filter, so that particulate matter in the exhaust gas is burned or ignited at a low temperature while reducing $NO_x$ by the remaining particulate matter and hydrocarbons in the exhaust gas.

DETAILED DESCRIPTION OF THE INVENTION

The base metal catalyst for removing particulate matter in the first exhaust gas cleaner of the present invention is composed of (a) at least one of alkali metal elements, and (b) one or more elements selected from the group consisting of transition elements (excluding platinum-group elements) and Sn. The transition elements are preferably those in IB, IIB, VA (V, Nb, Ta), VIA (Cr, Mo, W), VIIA (Mn, Re) and VIII (Fe, Co, Ni) groups of the Periodic Table. This base metal catalyst serves to increase the burning rate of particulate matter and to lower the ignition temperature of particulate matter. A combination of the components (a) and (b) is effective to increase the catalytic activity.

Further, to accelerate the reduction of nitrogen oxides at a relatively low temperature by burning or igniting remaining (unburned) hydrocarbons and particulate matter, the base metal catalyst for removing particulate matter in the second exhaust gas cleaner of the present invention is composed of (a) at least one of alkali metal elements, (b) one or more elements selected from the group consisting of IIA elements of the Periodic Table, transition elements (excluding platinum-group elements) and Sn, and (c) at least one of rare earth elements. In the presence of this base metal catalyst, nitrogen oxides can effectively be reduced by remaining (unburned) hydrocarbons and particulate matter functioning as reducing agents even at a relatively low temperature. This can be achieved by a synergistic effect provided by particulate matter existing together with the alkali metal elements, the transition elements and the rare earth elements.

The alkali metal elements are preferably K, Na and Cs.

Incidentally, in the above base metal catalysts, alkali metal elements, IIA elements, transition elements, Sn and rare earth elements exist as their oxides.

The preferred base metal catalyst used in the second exhaust gas cleaner is composed of Cs (alkali metal element), Cu (IB element) and at least one of Ce and La (rare earth elements). This base metal catalyst may further contain Ag (IB element). This base metal catalyst is highly effective to lower the ignition temperature of particulate matter.

In the third exhaust gas cleaner, the catalyst composed of Cs (alkali metal element), Cu (IB element) and at least one of Ce and La (rare earth elements) is supported by the overall body of the filter.

On the other hand, as catalysts for removing unburned hydrocarbons and CO and for burning the remaining particulate matter, those containing platinum-group elements having high oxidation activity are used. The preferred examples of such catalysts include Pt catalysts, Pd catalysts, mixtures of Pt catalysts and Pd catalysts, mixtures of Pt catalysts, Pd catalysts and Rh catalysts. These platinum-group element catalysts may further contain Au or Ag.

In the present invention, the above two types of catalysts are separately supported by two portions of the filter; a low-density portion and a high-density, thin layer portion. In the first embodiment, the low-density portion is located on the inlet side while the high-density, thin layer portion is located on the outlet side. In the second embodiment, the low-density portion and the high-density, thin layer portion are located oppositely. Namely, the high-density, thin layer portion is located on the inlet side while the low-density portion is located on the outlet side.

In the first and third methods, the base metal catalyst for removing particulate matter is supported by a filter portion having a relatively low density on the exhaust gas inlet side of the filter, while the platinum-group element catalyst for removing remaining (unburned) hydrocarbons and CO is supported by a high-density, thin layer portion on the exhaust gas outlet side of the filter.

In the second and fourth methods, the platinum-group element catalyst is supported by a high-density, thin layer portion on the exhaust gas inlet side of the filter, while the base metal catalyst is supported by a low-density portion on the exhaust gas outlet side of the filter.

By the filter arrangement used in the first and third methods, extremely high capacity for cleaning the exhaust gas can be achieved by the following features:

(1) Since the filter has a low-density portion on the exhaust gas inlet side, particulate matter easily goes into fine pores of the filter.

(2) Since the exhaust gas is brought into good contact with the catalysts supported in the fine pores of the filter, particulate matter is efficiently burned or ignited on the surfaces of the catalysts on the exhaust gas inlet side.

(3) Even when back pressure is increased, particulate matter is not blown off.

(4) Since the exhaust gas is efficiently cleaned for the above reason (2), drastic pressure drop does not take place.

In addition to the above advantages, there are the following advantages:

(5) Since a considerable amount of oxygen in the exhaust gas is consumed in the inlet portion of the filter, the concentration of the remaining oxygen is relatively low on the surface of the high-density, thin layer portion on the outlet side, but CO and remaining (unburned) hydrocarbons are effectively removed.

(6) Since the platinum-group element catalyst is supported in the high-density, thin layer portion on the exhaust gas outlet side, the generation of $SO_3$ can be suppressed.

(7) Since the exhaust gas comes into contact with the platinum-group element catalyst after burning particulate matter, it is not likely that the catalytic activity of the platinum-group element catalyst is lowered by the resulting ashes.

(8) Since the high-density, thin layer portion is disposed on the exhaust gas outlet side of the filter, the exhaust gas flowing through the filter undergoes proper resistance by this high-density, thin layer portion. Accordingly, efficient cleaning of the exhaust gas can be achieved even though the low-density portion in which particulate matter is removed is relatively thin.

The filter arrangement used in the second and fourth methods has the following features:

(1) Since the filter has a high-density, thin layer portion on the exhaust gas inlet side, particulate matter is effectively trapped in the inlet portion of the filter.

(2) Since the exhaust gas is brought into good contact with the catalysts supported in the high-density, thin layer portion on the inlet side, remaining (unburned) hydrocarbons and CO are oxidized and particulate matter is efficiently burned or ignited on the surfaces of the catalysts on the exhaust gas inlet side.

(3) Even when back pressure is increased, particulate matter is not blown off. And particulate matter passing through the high-density, thin layer portion goes into fine pores of the filter on the outlet side, where the particulate matter is efficiently burned.

(4) Since the exhaust gas is efficiently cleaned for the above reason (2), drastic pressure drop does not take place.

(5) The platinum-group element catalyst supported in the high-density, thin layer portion on the exhaust gas inlet side serves preferentially to oxidize remaining (unburned) hydrocarbons and CO, while suppressing the generation of $SO_3$.

The heat-resistant, porous foam-type filter is required to have necessary particulate matter-capturing capacity while causing pressure drop within the permitted range. It is thus preferably constituted by a ceramic foam usually used as a catalyst carrier, such as alumina, silica, zirconia, silica-alumina, alumina-zirconia, alumina-titania, silica-titania, silica-zirconia, titania-zirconia, mullite, cordierite, etc.

The high-density, thin layer portion can be formed on one side of the heat-resistant, porous foam-type filter by the following methods:

(a) A slurry of a ceramic foam material such as cordierite is poured into a mold having a desired shape whose bottom surface is coated with a parting agent comprising glycerin, water and a surfactant, and the resulting molded product is removed from the mold, dried and then sintered.

(b) A uniform ceramic filter is first formed, and one surface of the filter is coated with a mixture of ceramic powder such as cordierite and an organic binder. The resulting composite filter is dried and then sintered.

The heat-resistant, porous foam-type filter thus formed preferably has a high-density, thin layer portion having a porosity of 40–70% and a pore size of 3–80 µm (average: about 20–30 µm). To prevent the accumulation of ashes, the pore size is preferably 30 µm or more. The high-density, thin layer portion per se has a thickness of 5–2000 µm, preferably 10–50 µm.

To increase the ignition characteristics of particulate matter and to reduce pressure drop, the overall filter is preferably made thin. In the preferred embodiment, the diameter of the filter is 50–400 µm, while the length of the filter is 5–30 mm. Depending upon displacements of diesel engines used, a plurality of filters may be stacked.

The impregnation of the heat-resistant, porous foam-type filter with the particulate matter-removing catalyst may be conducted by a known method in which the heat-resistant, porous foam-type filter is immersed in a solution of carbonate, nitrate, acetate, hydroxide of such catalyst material. Alternatively, it may be conducted by immersing the filter in a solution containing a plurality of base metal compounds such as alkali ferrocyanide to make the filter carry the base metal catalyst.

The impregnation of the high-density, thin layer portion of the filter with the platinum-group element catalyst can be conducted by immersing only the high-density, thin layer portion of the filter in a solution of platinum-group element chloride, etc.

To increase the catalyst-supporting area of the filter, it is desirable that the heat-resistant, porous foam-type filter supports the catalysts via porous carrier powder having a large surface area such as alumina powder, silica powder, titania powder, etc. Particularly, since the high-density, thin layer portion has a relatively small thickness, it is desirable to carry the catalyst in a high concentration. For this purpose, titania powder, alumina powder, etc. are desirable. For instance, the high-density, thin layer portion is first coated with porous titania carrier powder having a large surface area such as titania powder, titania-alumina powder, titania-silica powder, etc. and then impregnated with an aqueous solution of chloride of Pt, Pd, Rh, Au, etc. by immersion.

Further, by conducting light irradiation to the filter impregnated with an aqueous solution of precious metal compounds such as chlorides of Pt, Pd, Rh, Au, etc., catalyst-carrying efficiency is extremely increased. Alternatively, it is possible to have the titania carrier powder support the platinum-group element catalyst by light irradiation and then to coat the catalyst-supporting titania carrier powder on the filter. By this light irradiation method, the catalyst can be supported by the titania carrier powder in high dispersion, and the coating layer of the filter can be made thin, whereby pressure drop can be minimized in the high-density, thin layer portion.

The present invention will be explained in further detail by the following Examples. Incidentally, the amount of each base metal oxide contained in base metal catalysts is expressed as a weight of a base metal element itself in Examples.

EXAMPLE 1

A ceramic foam filter made of cordierite having an apparent volume of 2 l and a density of 0.65 g/ml was formed on one side with a high-density, thin layer portion having a density of 2.2 g/ml by the above method (a).

A filter portion excluding this high-density, thin layer portion was coated with γ-alumina powder (average particle size: 0.4 µm) in an amount of 10 weight % based on the ceramic foam filter, and the γ-alumina powder was impregnated with 2.5 weight % of potassium by using potassium carbonate and then 2.5 weight % of Cr by using $CrCl_3$. The high-density, thin layer portion was coated with γ-alumina powder in an amount of 1 weight % based on the thin layer portion and then impregnated with 0.2 weight %, based on the γ-alumina, of Pt by using an $H_2PtCl_6$ aqueous solution.

($Al_2O_3$/K/Cr-$Al_2O_3$/Pt: Example 1).

With its low-density portion on the inlet side and with its high-density, thin layer portion on the outlet side, this exhaust gas cleaner was evaluated with respect to ignition temperature of particulate matter (expressed by temperature at which pressure drop decreases) and exhaust gas cleaning capacity by using a single-cylinder diesel engine having a displacement of 510 cc. The diesel engine was operated at 1500 rpm under a load of 90%. Under these conditions, CO was about 460 ppm and oxygen concentration was 5% in the exhaust gas. The ignition temperature, the particulate matter-removing efficiency and the CO conversion ratio of the exhaust gas cleaner are shown in Tables 1–3, respectively.

EXAMPLES 2–4

In the same manner as in Example 1, each of three ceramic foam filters was prepared and coated with γ-alumina, and a filter portion excluding a high-density, thin layer portion of each ceramic foam filter was impregnated with 2.5 weight % of Na by using sodium carbonate and 2.5 weight % of Cu by using $CuCl_2$ (Example 2); with 2.5 weight % of K by using potassium carbonate and 2.5 weight % of Mn by using $MnCl_2$ (Example 3); or with 2.5 weight % of K by using potassium carbonate and 2.5 weight % of V by using $NH_4VO_3$ (Example 4). Next, a high-density thin layer portion of each ceramic foam filter was impregnated with 0.2 weight % of Pt. Thus, the following exhaust gas cleaners were produced:

($Al_2O_3$/Na/Cu-$Al_2O_3$/Pt: Example 2), ($Al_2O_3$/K/Mn-$Al_2O_3$/Pt: Example 3), and $Al_2O_3$/K/V-$Al_2O_3$/Pt: Example 4).

EXAMPLES 5–8

Each of four ceramic foam filters was coated in a filter portion excluding a high-density, thin layer portion with γ-alumina and impregnated with the same catalyst as in Examples 1–4 in the same manner as above. Next, the high-density, thin layer portion of each filter was coated with $TiO_2$ powder (average particle size: 0.02 µm) instead of $Al_2O_3$ powder in an amount of 1 weight % based on the high-density, thin layer portion, and then immersed in an $H_2PtCl_6$ and/or $PdCl_2$ aqueous solution and subjected to light irradiation by using a 500-W Hg lamp. Thus, each high-density, thin layer portion was impregnated with 0.2 weight % of Pt and/or Pd. The resulting exhaust gas cleaners are as follows:

($Al_2O_3$/K/Cr-$TiO_2$/Pt: Example 5), ($Al_2O_3$/Na/Cu-$TiO_2$/Pd: Example 6), ($Al_2O_3$/K/Mn-$TiO_2$/Pt/Pd: Example 7), and ($Al_2O_3$/K/V-$TiO_2$/Pt: Example 8).

These exhaust gas cleaners of Examples 2–8 were evaluated with respect to ignition temperature of particulate matter and exhaust gas cleaning capacity in the same manner as in Example 1. In each exhaust gas cleaner, the ignition temperature (Examples 1–4), the particulate matter-removing efficiency at 300° C. (Examples 1, 2, 5), and the CO conversion ratio at 400° C. (Examples 1-8) are shown in Tables 1-3, respectively.

COMPARATIVE EXAMPLES 1-4

For comparison, the following four exhaust gas cleaners were produced and evaluated in the same manner as in Example 1 with respect to ignition temperature, particulate matter-removing efficiency and CO conversion ratio. The results are shown in Tables 1-3.

COMPARATIVE EXAMPLE 1: Filter carrying no catalyst;

COMPARATIVE EXAMPLE 2: Filter carrying the same base metal catalyst as in Example 1 but having no high-density, thin layer portion;

COMPARATIVE EXAMPLE 3: Filter constituted by a high-density, thin layer portion carrying no platinum-group element catalyst and a low-density portion having a catalyst of $Al_2O_3/K/Cr$ for trapping particulate matter.

COMPARATIVE EXAMPLE 4: Filter constituted by a high-density, thin layer portion carrying no platinum-group element catalyst and a low-density portion having a catalyst of $Al_2O_3/Na/Cu$ for trapping particulate matter.

TABLE 1

| No. | Ignition Temp. (°C.) |
|---|---|
| Example 1 | 375 |
| Example 2 | 390 |
| Example 3 | 380 |
| Example 4 | 385 |
| Comparative Example 1 | 600 |

TABLE 2

| No. | CO Trapping Efficiency at 300° C. (%) |
|---|---|
| Example 1 | 85 |
| Example 2 | 87 |
| Example 5 | 82 |
| Comparative Example 2 | 50 |

TABLE 3

| No. | Concentration of CO | |
|---|---|---|
| | at Inlet (ppm) | at Outlet (ppm) |
| Example 1 | 460 | 312 |
| Example 2 | 458 | 320 |
| Example 3 | 463 | 315 |
| Example 4 | 460 | 310 |
| Example 5 | 458 | 290 |
| Example 6 | 460 | 295 |
| Example 7 | 450 | 270 |
| Example 8 | 460 | 290 |
| Comparative Example 3 | 456 | 470 |
| Comparative Example 4 | 462 | 478 |

The exhaust gas cleaners of Examples 1-4 showed ignition temperatures lower than 400° C., meaning high-particulate matter-trapping capacity. With respect to the particulate matter-trapping efficiency at 300° C., those filters provided with high-density, thin layer portions showed 80% or more, while those having no high-density, thin layer portions showed only 50%. With respect to the removal of CO, the exhaust gas cleaners having no platinum-group element supported in the thin layer portions showed substantially no CO-removing capacity, and rather showed a tendency of increasing CO. On the other hand, the exhaust gas cleaners carrying platinum-group elements showed a CO-removing capacity of 30% or more, and particularly in the case of exhaust gas cleaners carrying platinum-group elements deposited by light irradiation showed a CO-removing capacity of 35% or more. In addition, when these exhaust gas cleaners were used, substantially no $SO_3$ was generated.

EXAMPLE 9

A ceramic foam filter having a low-density portion and a high-density, thin layer portion each carrying the following catalyst was produced in the same manner as in Example 1.

($Al_2O_3$/K/Cr-$Al_2O_3$/Pt: Example 9).

With its high-density, thin layer portion on the inlet side and with its low-density portion on the outlet side, this exhaust gas cleaner was evaluated with respect to ignition temperature of particulate matter and exhaust gas cleaning capacity in the same manner as in Example 1. The ignition temperature, the particulate matter-trapping efficiency and the CO conversion ratio of the exhaust gas cleaner are shown in Tables 4-6, respectively.

EXAMPLES 10-12

In the same manner as in Example 9, each of three ceramic foam filters was prepared and coated with γ-alumina, and a filter portion excluding a high-density, thin layer portion of each ceramic foam filter was impregnated with 2.5 weight % of Na by using sodium carbonate and 2.5 weight % of Cu by using $CuCl_2$ (Example 10); with 2.5 weight % of K by using potassium carbonate and 2.5 weight % of Mn by using $MnCl_2$ (Example 11); or with 2.5 weight % of K by using potassium carbonate and 2.5 weight % of V by using $NH_4VO_3$ (Example 12). Next, a high-density thin layer portion of each ceramic foam filter was impregnated with 0.2 weight % of Pt. Thus, the following exhaust gas cleaners were produced:

($Al_2O_3$/Na/Cu-$Al_2O_3$/Pt: Example 10), ($Al_2O_3$/K/Mn-$Al_2O_3$/Pt: Example 11), and ($Al_2O_3$/K/V-$Al_2O_3$/Pt: Example 12).

EXAMPLES 13-16

Each of four ceramic foam filters was coated with γ-alumina in a filter portion excluding a high-density, thin layer portion and impregnated with the same catalyst as in Examples 9-12 in the same manner as above. Next, the high-density, thin layer portion of each filter was coated with $TiO_2$ powder (average particle size: 0.02 μm) instead of $Al_2O_3$ powder in an amount of 1 weight % based on the high-density, thin layer portion, and then immersed in an $H_2PtCl_6$ and/or $PdCl_2$ aqueous solution and subjected to light irradiation by using a 500-W Hg lamp. Thus, each high-density, thin layer portion was impregnated with 0.2 weight % of Pt and/or Pd. The resulting exhaust gas cleaners are as follows:

($Al_2O_3$/K/Cr-$TiO_2$/Pt: Example 13), ($Al_2O_3$/Na/Cu-$TiO_2$/Pd: Example 14), ($Al_2O_3$/K/Mn-$TiO_2$/Pt/Pd: Example 15), and ($Al_2O_3$/K/V-$TiO_2$/Pt: Example 16).

These exhaust gas cleaners of Examples 10–16 were evaluated with respect to ignition temperature of particulate matter and exhaust gas cleaning capacity in the same manner as in Example 9. In each exhaust gas cleaner, the ignition temperature (Examples 9–12), the particulate matter-trapping efficiency at 300° C. (Examples 9, 10, 13), and the CO conversion ratio at 400° C. (Examples 9–16) are shown in Tables 4–6, respectively.

COMPARATIVE EXAMPLES 5–8

For comparison, the following four exhaust gas cleaners were evaluated with their high-density, thin layer portion on the inlet side, with respect to ignition temperature, particulate matter-trapping efficiency and CO conversion ratio. The results are shown in Tables 4–6.

Comparative Example 5: Filter carrying no catalyst;

Comparative Example 6: Filter carrying the same base metal catalyst as in Example 9 but having no high-density, thin layer portion;

Comparative Example 7: Filter constituted by a high-density, thin layer portion carrying no platinum-group element catalyst and a low-density portion having a catalyst of $Al_2O_3/K/Cr$ for trapping particulate matter.

Comparative Example 8: Filter constituted by a high-density, thin layer portion carrying no platinum-group element catalyst and a low-density portion having a catalyst of $Al_2O_3/Na/Cu$ for removing particulate matter.

TABLE 4

| No. | Ignition Temp. (°C.) |
|---|---|
| Example 9 | 340 |
| Example 10 | 360 |
| Example 11 | 350 |
| Example 12 | 360 |
| Comparative Example 5 | 600 |

TABLE 5

| No. | CO Trapping Efficiency at 300° C. (%) |
|---|---|
| Example 9 | 90 |
| Example 10 | 92 |
| Example 13 | 88 |
| Comparative Example 6 | 50 |

TABLE 6

| | Concentration of CO | |
|---|---|---|
| No. | at Inlet (ppm) | at Outlet (ppm) |
| Example 9 | 460 | 260 |
| Example 10 | 458 | 270 |
| Example 11 | 463 | 265 |
| Example 12 | 460 | 260 |
| Example 13 | 458 | 240 |
| Example 14 | 460 | 250 |
| Example 15 | 450 | 220 |
| Example 16 | 460 | 240 |
| Comparative Example 7 | 456 | 470 |

TABLE 6-continued

| | Concentration of CO | |
|---|---|---|
| No. | at Inlet (ppm) | at Outlet (ppm) |
| Comparative Example 8 | 462 | 478 |

The exhaust gas cleaners of Examples 9–12 showed ignition temperatures lower than 400° C., meaning high-particulate matter-trapping capacity. With respect to the particulate matter-trapping efficiency at 300° C., those filters provided with high-density, thin layer portions showed 80% or more, while those having no high-density, thin layer portions showed only 50%. With respect to the removal of CO, the exhaust gas cleaners having no platinum-group element supported in the thin layer portions showed substantially no CO-removing capacity, and rather showed a tendency of increasing CO. On the other hand, the exhaust gas cleaners carrying platinum-group elements showed a CO-removing capacity of 40% or more, and particularly in the case of exhaust gas cleaners carrying platinum-group elements deposited by light irradiation showed a CO-removing capacity of 45% or more. In addition, when these exhaust gas cleaners were used, substantially no $SO_3$ was generated.

EXAMPLE 17

The same ceramic foam filter as in Example 1 was formed, and its high-density, thin layer portion was coated with γ-alumina powder (average particle size: 0.4 μm) in an mount of 1 weight % based on the thin layer portion and then impregnated with 0.2 weight % based on the γ-alumina, of Pt by using an $H_2PtCl_6$ aqueous solution.

A filter portion excluding this high-density, thin layer portion was coated with γ-alumina powder in an amount of 10 weight % based on the ceramic foam filter, and the γ-alumina powder was impregnated with 2.5 weight % of Cu by using a $Cu(NO_3)_2$ aqueous solution, 2.5 weight % of Ce by using a $Ce(NO_3)_3$ aqueous solution and then 2.5 weight % of K by using a $K_2CO_3$ aqueous solution.

($Al_2O_3/Cu/Ce/K-Al_2O_3/Pt$: Example 17).

With its low-density portion on the inlet side and with its high-density, thin layer portion on the outlet side, this exhaust gas cleaner was evaluated with respect to ignition temperature of particulate matter and exhaust gas cleaning capacity in the same manner as in Example 1.

The ignition temperature of particulate matter is shown in Table 7, and the variation in concentration of CO and $NO_x$ and the hydrocarbon (HC) conversion ratio are shown in Table 8.

EXAMPLES 18–21

In the same manner as in Example 17, each of four ceramic foam filters was formed with a high-density, thin layer portion, and the high-density thin layer portion of each ceramic foam filter was coated with γ-alumina in an amount of 1 weight % based on the thin layer portion, and then impregnated with 0.2 weight % of Pt by using an $H_2PtCl_6$ aqueous solution.

A filter portion excluding the high-density, thin layer portion of each ceramic foam filter was coated with γ-alumina powder in an amount of 10 weight % based on the ceramic foam filter, and then impregnated with 2.5 weight % of Fe by using an $Fe(NO_3)_3$ aqueous solution, 2.5 weight % of La by using an $LaCl_3$ aqueous solution, 2.5 weight % of Na by using an $Na_2CO_3$ aqueous solution, and 1 weight % of Zn by using a $Zn(NO_3)_2$ aqueous solution (Example 18); with 2.5 weight % of Mg by using an $MgCl_2$ aqueous solution, 2.5 weight % of Ce by using a $Ce(NO_3)_3$ aqueous solution and 2.5 weight % of K by using a $K_2CO_3$ aqueous solution (Example 19); with 2.5 weight % of Co by using a $Co(NO_3)_2$ aqueous solution, 2.5 weight % of Ce by using a $Ce(NO_3)_3$ aqueous solution and 2.5 weight % of Na by using an $Na_2CO_3$ aqueous solution (Example 20); or with 2.5 weight % of Mn by using an $MnCl_2$ aqueous solution, 2.5 weight % of Ce by using a $Ce(NO_3)_3$ aqueous solution and 2.5 weight % of K by using a $K_2CO_3$ aqueous solution (Example 21). Thus, the following exhaust gas cleaners were produced:

($Al_2O_3$/Fe/La/Na/Zn-$Al_2O_3$/Pt: Example 18), ($Al_2O_3$/Mg/Ce/K-$Al_2O_3$/Pt: Example 19), ($Al_2O_3$/Co/Ce/Na-$Al_2O_3$/Pt: Example 20), and ($Al_2O_3$/Mn/Ce/K-$Al_2O_3$/Pt: Example 21).

These exhaust gas cleaners of Examples 18–21 were evaluated with respect to ignition temperature of particulate matter and exhaust gas cleaning capacity in the same manner as in Example 17. The results are shown in Tables 7 and 8.

EXAMPLES 22–28

In the same manner as in Example 17, each of seven ceramic foam filters was formed with a high-density, thin layer portion and then coated with $TiO_2$ powder (average particle size: 0.02 μm) in an amount of 1 weight % based on the thin layer portion, and the high-density thin layer portion of each ceramic foam filter was impregnated with one or more of 0.2 weight % of Pt by using an $H_2PtCl_6$ aqueous solution, 0.2 weight % of Pd by using a $PdCl_2$ aqueous solution, and 0.01 weight % of Rh by using an $RhCl_3$ aqueous solution, and then subjected to light irradiation using a 500-W Hg lamp.

A filter portion excluding the high-density, thin layer portion of each ceramic foam filter was coated with γ-alumina powder in an amount of 10 weight % based on the ceramic foam filter, and then impregnated with each aqueous solution of various base metal compounds. Incidentally, the impregnation of Cs and Ag was conducted by using an aqueous solution of $CsNO_3$ and $AgNO_3$, respectively. The resulting exhaust gas cleaners are as follows:

($Al_2O_3$/K/Cu/Ce-$TiO_2$/Pt: Example 22), ($Al_2O_3$/Na/Fe/Zn/La-$TiO_2$/Pd: Example 23), ($Al_2O_3$/K/Mg/Ce-$TiO_2$/Pt/Rh: Example 24), ($Al_2O_3$l/Na/Co/Ce-$TiO_2$/Pt: Example 25), ($Al_2O_3$/K/Mn/Ce-$TiO_2$/Pt/Pd: Example 26), ($Al_2O_3$/Cu/Ce/Cs-$TiO_2$/Pt: Example 27), and ($Al_2O_3$/Cu/Ce/Cs/Ag-$TiO_2$/Pd: Example 28).

These exhaust gas cleaners of Examples 22–28 were evaluated with respect to ignition temperature of particulate matter and exhaust gas cleaning capacity in the same manner as in Example 17. The results are shown in Tables 7 and 8.

EXAMPLES 29–31

In the same manner as in Example 17, each of three ceramic foam filters was formed with a high-density, thin layer portion, and the high-density thin layer portion of each ceramic foam filter was coated with $TiO_2$ powder in an amount of 1 weight % based on the thin layer portion and then impregnated with one or more of 0.2 weight % of Pt by using an $H_2PtCl_6$ aqueous solution, 0.2 weight % of Pd by using a $PdCl_2$ aqueous solution, and 0.01 weight % of Rh by using an $RhCl_3$ aqueous solution, and subjected to light irradiation using a 500-W Hg lamp.

A filter portion excluding the high-density, thin layer portion of each ceramic foam filter was coated with $TiO_2$ powder in an amount of 10 weight % based on the ceramic foam filter, and then impregnated with each aqueous solution of various base metal compounds. The resulting exhaust gas cleaners are as follows:

($TiO_2$/Cu/La/Cs-$TiO_2$/Pt: Example 29), ($TiO_2$/Cu/La/Cs/Ce-$TiO_2$/Pt/Pd: Example 30), and ($TiO_2$/Cu/La/Cs/Ag-$TiO_2$/Pt/Rh: Example 31).

These exhaust gas cleaners of Examples 29–31 were evaluated with respect to ignition temperature of particulate matter and exhaust gas cleaning capacity in the same manner as in Example 17. The results are shown in Tables 7 and 8.

COMPARATIVE EXAMPLES 9 AND 10

For comparison, the same ceramic foam filters each having a high-density, thin layer portion and a low-density portion were produced in the same manner as in Example 17, and a low-density portion of each filter was provided with a catalyst in the same manner as in Example 17. However, no platinum-group element catalyst was supported by the high-density, thin layer portion. The resulting filters are as follows:

($Al_2O_3$/K/Cu/Ce: Comparative Example 9), and ($Al_2O_3$/Na/Fe/La: Comparative Example 10).

They were evaluated with respect to variation in concentration of CO and $NO_x$, and HC conversion ratio. The results are shown in Table 8.

TABLE 7

| No. | Ignition Temp. (°C.) |
| --- | --- |
| Example 17 | 405 |
| Example 18 | 405 |
| Example 19 | 430 |
| Example 20 | 405 |
| Example 21 | 380 |
| Example 22 | 400 |
| Example 23 | 400 |
| Example 24 | 410 |
| Example 25 | 400 |
| Example 26 | 370 |
| Example 27 | 260 |
| Example 28 | 249 |
| Example 29 | 255 |
| Example 30 | 251 |
| Example 31 | 240 |

TABLE 8

Exhaust Gas Concentration at 360° C. (ppm)

| No. | CO at Inlet | CO at Outlet | $NO_x$ at Inlet | $NO_x$ at Outlet | HC Conversion Rate (%) |
| --- | --- | --- | --- | --- | --- |
| Example 17 | 460 | 310 | 479 | 355 | 75 |
| Example 18 | 465 | 315 | 480 | 360 | 73 |
| Example 19 | 463 | 314 | 475 | 358 | 72 |
| Example 20 | 458 | 310 | 485 | 368 | 75 |
| Example 21 | 462 | 315 | 480 | 365 | 78 |
| Example 22 | 460 | 293 | 482 | 353 | 80 |
| Example 23 | 462 | 290 | 475 | 355 | 75 |
| Example 24 | 463 | 285 | 479 | 353 | 80 |
| Example 25 | 463 | 290 | 482 | 360 | 80 |

TABLE 8-continued

Exhaust Gas Concentration at 360° C. (ppm)

| No. | CO at Inlet | CO at Outlet | NO$_x$ at Inlet | NO$_x$ at Outlet | HC Conversion Rate (%) |
|---|---|---|---|---|---|
| Example 26 | 462 | 300 | 485 | 360 | 85 |
| Example 27 | 460 | 300 | 480 | 350 | 80 |
| Example 28 | 460 | 300 | 480 | 360 | 80 |
| Example 29 | 465 | 310 | 480 | 355 | 75 |
| Example 30 | 460 | 310 | 475 | 350 | 78 |
| Example 31 | 462 | 310 | 482 | 348 | 85 |
| Comparative Example 9 | 463 | 465 | 483 | 390 | 70 |
| Comparative Example 10 | 464 | 466 | 481 | 395 | 70 |

Each of the exhaust gas cleaners in Examples 17–31 showed a low ignition temperature of particulate matter, and those cleaners of Examples 27–31 having catalysts containing combinations of Cs, Cu, Ce, La and Ag have remarkably low ignition temperatures. In addition, at 360° C., the concentration of CO was reduced by about 35%, and the concentration of NO$_x$ was reduced by about 25%, showing that particulate matter, CO and NO$_x$ were simultaneously removed. Further, the conversion rate of the remaining hydrocarbons was also high.

With respect to the removal of CO, the exhaust gas cleaners having no platinum-group element supported in the thin layer portions (Comparative Examples 9 and 10) showed substantially no CO-removing capacity. On the other hand, the exhaust gas cleaners having platinum-group elements supported on the high-density, thin layer portion showed a high CO-removing capacity. In addition, when these exhaust gas cleaners were used, substantially no SO$_3$ was generated.

Further, when the exhaust gas cleaners have the platinum-group elements deposited on the high-density, thin layer portion by light irradiation, the HC conversion rate became somewhat higher than those having platinum-group elements deposited by other methods (HC conversion rate was 72–78% in Examples 17–21, and 75–85% in Examples 22–31).

EXAMPLE 32

The same ceramic foam filter as in Example 1 was formed, and its high-density, thin layer portion was coated with γ-alumina powder (average particle size: 0.4 μm) in an amount of 1 weight % based on the thin layer portion and then impregnated with 0.2 weight % based on the γ-alumina, of Pt by using an H$_2$PtCl$_6$ aqueous solution.

A filter portion excluding this high-density, thin layer portion was coated with γ-alumina powder in an amount of 10 weight % based on the ceramic foam, and the γ-alumina powder was impregnated with 2.5 weight % of Cu by using a Cu(NO$_3$)$_2$ aqueous solution, 2.5 weight % of Ce by using a Ce(NO$_3$)$_3$ aqueous solution and 2.5 weight % of K by using a K$_2$CO$_3$ aqueous solution.

(Al$_2$O$_3$/Cu/Ce/K-Al$_2$O$_3$/Pt: Example 32).

With its high-density, thin layer portion on the inlet side and with its low-density portion on the outlet side, this exhaust gas cleaner was evaluated with respect to ignition temperature of particulate matter and exhaust gas cleaning capacity in the same manner as in Example 1. Incidentally, the concentrations of hydrocarbons (HC), CO, NO$_x$ and O$_2$ were 85 ppm (as total HC), 460 ppm, 480 ppm and 5%, respectively.

The ignition temperature of particulate matter is shown in Table 9, and the variation in concentration of CO and NO$_x$ and the hydrocarbon (HC) conversion ratio are shown in Table 10.

EXAMPLES 33–36

In the same manner as in Example 32, each of four ceramic foam filters was formed with a high-density, thin layer portion, and the high-density thin layer portion of each ceramic foam filter was coated with γ-alumina in an amount of 1 weight % based on the thin layer portion, and then impregnated with 0.2 weight % of Pt by using an H$_2$PtCl$_6$ aqueous solution.

A filter portion excluding the high-density, thin layer portion of each ceramic foam filter was coated with γ-alumina powder in an amount of 10 weight % based on the ceramic foam filter, and then impregnated with 2.5 weight % of Fe by using an Fe(NO$_3$)$_3$ aqueous solution, 2.5 weight % of La by using an LaCl$_3$ aqueous solution, 2.5 weight % of Na by using an Na$_2$CO$_3$ aqueous solution, and 1 weight % of Zn by using a Zn(NO$_3$)$_2$ aqueous solution (Example 33); with 2.5 weight % of Mg by using an MgCl$_2$ aqueous solution, 2.5 weight % of Ce by using a Ce(NO$_3$)$_3$ aqueous solution and 2.5 weight % of K by using a K$_2$CO$_3$ aqueous solution (Example 34); with 2.5 weight % of Co by using a Co(NO$_3$)$_2$ aqueous solution, 2.5 weight % of Ce by using a Ce(NO$_3$)$_3$ aqueous solution and 2.5 weight % of Na by using an Na$_2$CO$_3$ aqueous solution (Example 35); or with 2.5 weight % of Mn by using an MnCl$_2$ aqueous solution, 2.5 weight % of Ce by using a Ce(NO$_3$)$_3$ aqueous solution and 2.5 weight % of K by using a K$_2$CO$_3$ aqueous solution (Example 36). Thus, the following exhaust gas cleaners were produced:

(Al$_2$O$_3$/Fe/La/Na/Zn-Al$_2$O$_3$/Pt: Example 33), (Al$_2$O$_3$/Mg/Ce/K-Al$_2$O$_3$/Pt: Example 34), (Al$_2$O$_3$/Co/Ce/Na-Al$_2$O$_3$/Pt: Example 35), and (Al$_2$O$_3$/Mn/Ce/K-Al$_2$O$_3$/Pt: Example 36).

These exhaust gas cleaners of Examples 33–36 were evaluated with respect to ignition temperature of particulate matter and exhaust gas cleaning capacity in the same manner as in Example 32. The results are shown in Tables 9 and 10.

EXAMPLES 37–43

In the same manner as in Example 32, each of five ceramic foam filters was formed with a high-density, thin layer portion and then coated with TiO$_2$ powder (average particle size: 0.02 μm) in an amount of 1 weight % based on the thin layer portion, and the high-density thin layer portion of each ceramic foam filter was impregnated with one or more of 0.2 weight % of Pt by using an H$_2$PtCl$_6$ aqueous solution, 0.2 weight % of Pd by using a PdCl$_2$ aqueous solution, and 0.01 weight % of Rh by using an RhCl$_3$ aqueous solution, and then subjected to light irradiation using a 500-W Hg lamp.

A filter portion excluding the high-density, thin layer portion of each ceramic foam filter was coated with γ-alumina powder in an amount of 10 weight % based on the ceramic foam filter, and then impregnated with each aqueous solution of various base metal compounds. Incidentally, the impregnation of Cs and Ag was conducted by using an aqueous solution of CsNO$_3$ and AgNO$_3$, respectively. The resulting exhaust gas cleaners are as follows:

(Al$_2$O$_3$/K/Cu/Ce-TiO$_2$/Pt: Example 37), (Al$_2$O$_3$/Na/Fe/Zn/La-TiO$_2$/Pd: Example 38), (Al$_2$O$_3$/K/Mg/Ce-TiO$_2$/Pt/Rh: Example 39), ($Al_2O_3$/Na/Co/Ce-$TiO_2$/Pt: Example 40), ($Al_2O_3$/K/Mn/Ce-$TiO_2$/Pt/Pd: Example 41), ($Al_2O_3$/Cu/Ce/Cs-$TiO_2$/Pt: Example 42), and ($Al_2O_3$/Cu/Ce/Cs/Ag-$TiO_2$/Pd: Example 43).

These exhaust gas cleaners of Examples 37–43 were evaluated with respect to ignition temperature of particulate matter and exhaust gas cleaning capacity in the same manner as in Example 32. The results are shown in Tables 9 and 10.

EXAMPLES 44–46

In the same manner as in Example 32, each of three ceramic foam filters was formed with a high-density, thin layer portion, and the high-density thin layer portion of each ceramic foam filter was coated with $TiO_2$ powder in an amount of 1 weight % based on the thin layer portion and then impregnated with one or more of 0.2 weight % of Pt by using an $H_2PtCl_6$ aqueous solution, 0.2 weight % of Pd by using a $PdCl_2$ aqueous solution, and 0.01 weight % of Rh by using an $RhCl_3$ aqueous solution, and subjected to light irradiation using a 500-W Hg lamp.

A filter portion excluding the high-density, thin layer portion of each ceramic foam filter was coated with $TiO_2$ powder in an amount of 10 weight % based on the ceramic foam filter, and then impregnated with each aqueous solution of various base metal compounds. The resulting exhaust gas cleaners are as follows:

($TiO_2$/Cu/La/Cs-$TiO_2$/Pt: Example 44), ($TiO_2$/Cu/La/Cs/Ce-$TiO_2$/Pt/Pd: Example 45), and ($TiO_2$/Cu/La/Cs/Ag-$TiO_2$/Pt/Rh: Example 46).

These exhaust gas cleaners of Examples 44–46 were evaluated with respect to ignition temperature of particulate matter and exhaust gas cleaning capacity in the same manner as in Example 32. The results are shown in Tables 9 and 10.

COMPARATIVE EXAMPLES 11 AND 12

For comparison, the same ceramic foam filters each having a high-density, thin layer portion and a low-density portion were produced, and a low-density portion of each filter was provided with a catalyst ia Example 32. However, no platinum-group element catalyst was supported by the high-density, thin layer portion. The resulting filters are as follows:

($Al_2O_3$/K/Cu/Ce: Comparative Example 11), and ($Al_2O_3$/Na/Fe/La: Comparative Example 12).

They were evaluated with respect to variation in concentration of CO and $NO_x$, and hydrocarbon (HC) conversion ratio at 360° C. The results are shown in Table 10.

TABLE 9

| No. | Ignition Temp. (°C.) |
|---|---|
| Example 32 | 370 |
| Example 33 | 370 |
| Example 34 | 400 |
| Example 35 | 370 |
| Example 36 | 350 |
| Example 37 | 370 |
| Example 38 | 370 |
| Example 39 | 380 |
| Example 40 | 370 |

TABLE 9-continued

| No. | Ignition Temp. (°C.) |
|---|---|
| Example 41 | 340 |
| Example 42 | 255 |
| Example 43 | 243 |
| Example 44 | 250 |
| Example 45 | 245 |
| Example 46 | 240 |

TABLE 10

Exhaust Gas Concentration at 360° C. (ppm)

| No. | CO at Inlet | CO at Outlet | $NO_x$ at Inlet | $NO_x$ at Outlet | HC Conversion Rate (%) |
|---|---|---|---|---|---|
| Example 32 | 460 | 260 | 479 | 355 | 70 |
| Example 33 | 465 | 265 | 480 | 360 | 65 |
| Example 34 | 463 | 265 | 475 | 358 | 65 |
| Example 35 | 458 | 260 | 485 | 368 | 70 |
| Example 36 | 462 | 265 | 480 | 365 | 70 |
| Example 37 | 460 | 240 | 482 | 353 | 75 |
| Example 38 | 462 | 240 | 475 | 355 | 80 |
| Example 39 | 463 | 230 | 479 | 353 | 85 |
| Example 40 | 463 | 240 | 482 | 360 | 85 |
| Example 41 | 462 | 250 | 485 | 360 | 90 |
| Example 42 | 460 | 280 | 480 | 355 | 84 |
| Example 43 | 460 | 290 | 480 | 370 | 85 |
| Example 44 | 465 | 300 | 480 | 360 | 80 |
| Example 45 | 460 | 300 | 475 | 360 | 82 |
| Example 46 | 460 | 300 | 482 | 340 | 88 |
| Comparative Example 11 | 463 | 465 | 483 | 420 | 50 |
| Comparative Example 12 | 464 | 466 | 481 | 430 | 50 |

Each of the exhaust gas cleaners in Examples 32–46 showed a low ignition temperature of particulate matter, and those exhaust gas cleaners of Examples 42–46 having catalysts containing combinations of Cs, Cu, Ce, La and Ag have remarkably low ignition temperatures. In addition, at 360° C., the concentration of CO was reduced by about 35–50%, and the concentration of $NO_x$ was reduced by about 25%, showing that particulate matter, CO and $NO_x$ were simultaneously removed. Further, the conversion rate of the remaining hydrocarbons was also high.

With respect to the removal of CO, the exhaust gas cleaners having no platinum-group element supported in the thin layer portions (Comparative Examples 11 and 12) showed substantially no CO-removing capacity. On the other hand, the exhaust gas cleaners having platinum-group elements supported on the high-density, thin layer portion showed a high CO-removing capacity. In addition, when these exhaust gas cleaners were used, substantially no $SO_3$ was generated.

Further, when the exhaust gas cleaners have the platinum group elements deposited on the high-density, thin layer portion by light irradiation, the HC conversion rate became substantially higher than those having platinum-group elements deposited by other methods (HC conversion rate was 65–70% in Examples 32–36, and 75–90% in Examples 37–46).

EXAMPLE 47

The same ceramic foam filter as in Example 1 m was coated with γ-alumina powder in an amount of 10 weight % based on the ceramic foam, and the γ-alumina powder was impregnated with 10 weight % of Cu by using a $CuCl_2$ aqueous solution, 2.5 weight % of Ce by using a Ce(NO$_3$)$_3$ aqueous solution and 2.5 weight % of Cs by using a CsNO$_3$ aqueous solution. The filter impregnated with the above catalyst was dried at 150° C. and burned at 700° C. for 3 hours. The resulting exhaust gas cleaner is as follows:

(Al$_2$O$_3$/Cu/Ce/Cs: Example 47).

With its low-density portion on the inlet side and with its high-density, thin layer portion on the outlet side, this exhaust gas cleaner was evaluated with respect to ignition temperature of particulate matter and exhaust gas cleaning capacity in the same manner as in Example 1. Incidentally, the concentrations of NO$_x$ and oxygen in the exhaust gas were 480 ppm and 5%, respectively.

The ignition temperature of particulate matter is shown in Table 11, and the variation in concentration of NO$_x$ is shown in Table 12.

EXAMPLES 48–41

In the same manner as in Example 47, each of four ceramic foam filters was coated with titania powder in an amount of 10 weight % based on the ceramic foam filter, and then impregnated with 10 weight % of Cu by using a Cu(NO$_3$)$_2$ aqueous solution, 2.5 weight % of La by using an LaCl$_3$ aqueous solution and 2.5 weight % of Cs by using a CsNO$_3$ aqueous solution (Example 48); with 10 weight % of Cu by using a Cu(NO$_3$)$_2$ aqueous solution, 2.5 weight % of La by using an LaCl$_3$ aqueous solution, 2.5 weight % of Ce by using a Ce(NO$_3$)$_3$ aqueous solution and 2.5 weight % of Cs by using a Cs$_2$CO$_3$ aqueous solution (Example 49); with 10 weight % of Cu by using a Cu(NO$_3$)$_2$ aqueous solution, 2.5 weight % of Ce by using a Ce(NO$_3$)$_3$ aqueous solution, 2.5 weight % of Cs by using a CsNO$_3$ aqueous solution and 0.5 weight % of Ag by using an AgNO$_3$ aqueous solution (Example 50); or with 10 weight % of Cu by using a Cu(NO$_3$)$_2$ aqueous solution, 2.5 weight % of La by using an LaCl$_3$ aqueous solution, 2.5 weight % of Cs by using a CsNO$_3$ aqueous solution and 0.5 weight % of Ag by using an AgNO$_3$ aqueous solution (Example 51). Thus, the following exhaust gas cleaners were produced:

(TiO$_2$/Cu/La/Cs: Example 48), (TiO$_2$/Cu/La/Ce/Cs: Example 49), (TiO$_2$/Cu/Ce/Cs/Ag: Example 50), and (TiO$_2$/Cu/La/Cs/Ag: Example 51).

These exhaust gas cleaners of Examples 48–51 were evaluated with respect to ignition temperature of particulate matter and exhaust gas cleaning capacity in the same manner as in Example 47. The results are shown in Tables 11 and 12.

COMPARATIVE EXAMPLE 13

For comparison, a ceramic honeycomb filter (apparent volume: 1.6 l) was produced, and provided with a catalyst in the same manner as in Example 47. The resulting filter is as follows:

(Al$_2$O$_3$/Cu/Ce/Cs: Comparative Example 13).

It was evaluated with respect to ignition temperature of particulate matter and variation in concentration of NO$_x$. The results are shown in Table 12.

TABLE 11

| No. | Ignition Temp. (°C.) |
| --- | --- |
| Example 47 | 275 |
| Example 48 | 270 |
| Example 49 | 260 |

TABLE 11-continued

| No. | Ignition Temp. (°C.) |
| --- | --- |
| Example 50 | 260 |
| Example 51 | 250 |
| Comparative Example 13 | 340 |

TABLE 12

| | Concentration of NO$_x$ at 300° C. (ppm) | |
| --- | --- | --- |
| No. | at Inlet (ppm) | at Outlet (ppm) |
| Example 47 | 479 | 374 |
| Example 48 | 480 | 360 |
| Example 49 | 475 | 351 |
| Example 50 | 485 | 344 |
| Example 51 | 480 | 331 |
| Comparative Example 13 | 483 | 450 |

Each of the exhaust gas cleaners in Examples 47–51 showed a low ignition temperature of particulate matter, and the conversion ratio of NO$_x$ at 300° C. was about 20%, showing that particulate matter and NO$_x$ were simultaneously removed. The comparison with Comparative Example 13 shows that the ceramic foam filter having a large surface area is effective to lower the ignition temperature of particulate matter.

In addition, when these exhaust gas cleaners were used, substantially no SO$_3$ was generated.

By using the exhaust gas cleaner according to the present invention, particulate matter, unburned hydrocarbons, CO and NO$_x$ can be removed from the exhaust gas at a high efficiency. Such exhaust gas cleaners are effective for cleaning an exhaust gas containing a large concentration of oxygen and particulate matter such as those of diesel engines.

What is claimed is:

1. A method of cleaning an exhaust gas containing oxygen, particulate matter, SO$_2$, unburned hydrocarbons and CO, comprising passing said exhaust gas through an exhaust gas cleaner having a heat-resistant, porous ceramic-foam filter as a carrier, said filter being constituted by two portions consisting of a portion having a relatively low density and a high-density, thin layer portion having a thickness of 5–2,000 μm and formed on one side of said low-density portion, said low-density portion supporting a catalyst consisting essentially of (a) at least one of alkali metal elements, and (b) one or more elements selected from the group consisting of Sn, Fe, Co, Ni, IB elements, IIB elements, V, Nb, Ta, Cr, Mo, W, Mn, and Re of the Periodic Table, and said high-density, thin layer portion supporting an amount of catalyst consisting essentially of one or more of the elements selected from the group consisting of Ru, Rh, Pd, Os, Ir, and Pt effective for increasing the conversion of particulate matter, unburned hydrocarbons, and CO while not substantially converting SO$_2$ to SO$_3$, wherein said low-density portion is located on the exhaust gas inlet side of said filter, and said high-density thin layer portion is located on the exhaust gas outlet side of said filter, so that particulate matter in said exhaust gas is burned or ignited in said low-density portion and unburned hydrocarbons and CO in said exhaust gas are caused to react with remaining oxygen in said high-density, thin layer portion, thereby cleaning the exhaust gas while suppressing the formation of SO$_3$.

2. A method of cleaning an exhaust gas containing oxygen, particulate matter, $SO_2$, unburned hydrocarbons and CO, comprising passing said exhaust gas through an exhaust gas cleaner having a heat-resistant, porous ceramic-foam filter as a carrier, said filter being constituted by two portions consisting of a portion having a relatively low density and a high-density, thin layer portion having a thickness of 5–2,000 μm and formed on one side of said low-density portion, said low-density portion supporting a catalyst consisting essentially of (a) at least one of alkali metal elements, and (b) one or more elements selected from the group consisting of Sn, Fe, Co, Ni, IB elements, IIB elements, V, Nb, Ta, Cr, Mo, W, Mn, and Re of the Periodic Table, and said high-density, thin layer portion supporting a catalyst consisting essentially of one or more of the elements selected from the group consisting of Ru, Rh, Pd, Os, Ir, and Pt, wherein said high-density, thin layer portion is located on the exhaust gas inlet side of said filter, and said low-density portion is located on the exhaust gas outlet side of said filter, so that particulate matter in said exhaust gas is burned or ignited, and unburned hydrocarbons and CO in said exhaust gas are oxidized in said high-density, thin layer portion, and particulate matter passing through said high-density, thin layer portion is burned in said low-density portion, thereby cleaning the exhaust gas while suppressing the formation of $SO_3$.

3. A method of cleaning an exhaust gas containing oxygen, particulate matter, $NO_x$, $SO_2$, unburned hydrocarbons and CO, comprising passing said exhaust gas through an exhaust gas cleaner having a heat-resistant, porous ceramic-foam filter as a carrier, said filter being constituted by two portions consisting of a portion having a relatively low density and a high-density, thin layer portion having a thickness of 5–2000 μm and formed on one side of said low-density portion, said low-density portion supporting a catalyst consisting essentially of (a) at least one of alkali metal elements, (b) one or more elements selected from the group consisting of Sn, Fe, Co, Ni, IIA elements, IB elements, IIB elements, V, Nb, Ta, Cr, Mo, W, Mn, and Re of the Periodic Table, and (c) at least one of rare earth elements; and said high-density, thin layer portion supporting a catalyst consisting essentially of one or more of the elements selected from the group consisting of Ru, Rh, Pd, Os, Ir, and Pt, wherein said low-density portion is located on the exhaust gas inlet side of said filter, and said high-density, thin layer portion is located on the exhaust gas outlet side of said filter, so that particulate matter, unburned hydrocarbons and $NO_x$ in said exhaust gas are removed simultaneously in said low-density portion, and the remaining hydrocarbons and CO in said exhaust gas are caused to react with remaining oxygen in said high-density, thin layer portion, thereby cleaning the exhaust gas while suppressing the formation of $SO_3$.

4. A method of cleaning an exhaust gas containing oxygen, particulate matter, $NO_x$, $SO_2$, unburned hydrocarbons and CO, comprising passing said exhaust gas through an exhaust gas cleaner having a heat-resistant, porous ceramic-foam filter as a carrier, said filter being constituted by two portions consisting of a portion having a relatively low density and a high-density, thin layer portion having a thickness of 5–2,000 μm and formed on one side of said low-density portion, said low-density portion supporting a catalyst consisting essentially of (a) at least one of alkali metal elements, (b) one or more elements selected from the group consisting of Sn, Fe, Co, Ni, IIA elements, IB elements, IIB elements, V, Nb, Ta, Cr, Mo, W, Mn, and Re of the Periodic Table and (c) at least one of rare earth elements; and said high-density, thin layer portion supporting a catalyst consisting essentially of one or more of the elements selected from the group consisting of Ru, Rh, Pd, Os, Ir, and Pt, wherein said high-density, thin layer, portion is located on the exhaust gas inlet side of said filter, and said low-density is located on the exhaust gas outlet side of said filter, so that particulate matter, unburned hydrocarbons and CO in said exhaust gas are removed by oxidation in said high-density, thin layer portion, and $NO_x$ is reduced by the remaining hydrocarbons and particulate matter in said low-density portion, thereby cleaning the exhaust gas while suppressing the formation of $SO_3$.

5. The method of cleaning an exhaust gas according to claim 1, wherein said low-density portion supports a catalyst consisting essentially of (a) at least one alkali metal element selected from Na and K, and (b) one or more elements selected from Cr, Cu, Mn and V, and said high-density, thin layer portion supports a platinum-group element catalyst.

6. The method of cleaning an exhaust gas according to claim 2, wherein said low-density portion supports a catalyst consisting essentially of (a) at least one alkali metal element selected from Na and K, and (b) one or more elements selected from Cr, Cu, Mn and V, and said high-density, thin layer portion supports a platinum-group element catalyst.

7. The method of cleaning an exhaust gas according to claim 3, wherein said low-density portion supports a catalyst consisting essentially of (a) at least one alkali metal element selected from Na, K, and Cs, and (b) one or more elements selected from Cu, Fe, Zn, Mn, Co and Mg, and (c) at least one rare earth element selected from Ce and La, and said high-density, thin layer portion supports a platinum-group element catalyst.

8. The method of cleaning an exhaust gas according to claim 4, wherein said low-density portion supports a catalyst consisting essentially of (a) at least one alkali metal element selected from Na, K, and Cs, and (b) one or more elements selected from Cu, Fe, Zn, Mn, Co and Mg, and (c) at least one rare earth element selected from Ce and La, and said high-density, thin layer portion supports a platinum-group element catalyst.

* * * * *